(No Model.)
G. SHINE.
FARM GATE.
No. 340,376. Patented Apr. 20, 1886.
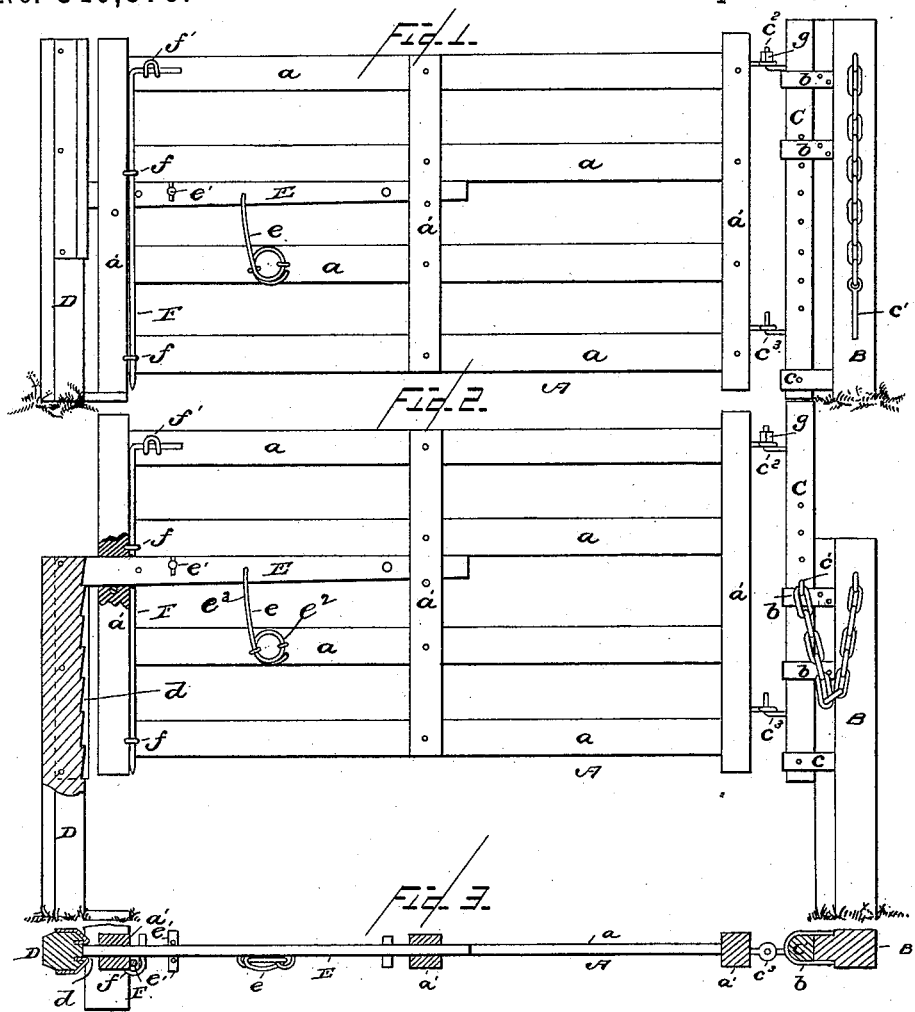
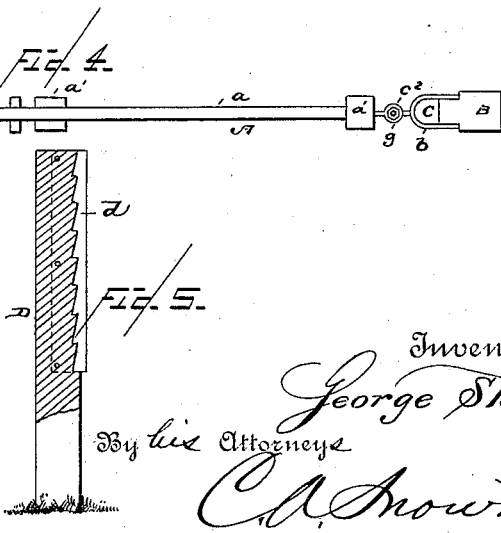
Witnesses
Inventor
George Shine.
By his Attorneys

UNITED STATES PATENT OFFICE.

GEORGE SHINE, OF BANGOR, MICHIGAN.

FARM-GATE.

SPECIFICATION forming part of Letters Patent No. 340,376, dated April 20, 1886.

Application filed January 29, 1886. Serial No. 190,198. (No model.)

*To all whom it may concern:*

Be it known that I, GEORGE SHINE, a citizen of the United States, residing at Bangor, in the county of Van Buren and State of Michigan, have invented new and useful Improvements in Farm-Gates, of which the following is a specification, reference being had to the accompanying drawings.

My invention relates to farm-gates, and has for its object the provision of a gate adapted to be raised to different desired distances from the ground, for the purpose of clearing obstacles beneath—as, for instance, snow, ice, &c.—and to support itself in such raised position.

To this end the invention consists in the construction, arrangement, and combination of parts, substantially as hereinafter described, and specifically pointed out in the claim.

In the drawings, Figure 1 represents a side elevation of a gate embodying my improvements, showing the gate at its lowest point. Fig. 2 is a similar elevation, partly in section, to show details of construction, the gate shown in raised position. Fig. 3 is a horizontal sectional view of my improved gate, taken on a line above the gate-latch. Fig. 4 is a plan view. Fig. 5 is a detail section taken through the front post.

Referring to the drawings, in which similar letters of reference denote similar parts, A designates the gate, having the ordinary construction—that is to say, longitudinal rails $a$, held in position by upright rails $a'$.

B designates a hinge-post, to which is loosely connected upon its forward side by straps $b$ $b$ a vertically-sliding post or bar, C, which operates within said straps $b$. To the lower end of said bar is secured a similar strap, $c$, the projecting ends of which partially encircle the rear post, B, as shown. The post C is provided with a series of apertures for the reception of the pin $c'$, whereby it is held at different heights with relation to the post B.

$c^2$ $c^3$ designate hinges, whereby the gate A is hinged to the post or bar C.

D designates the latch-post, and is provided upon its forward end with a groove, $d$, having its inner surface provided with a series of notches for the reception of the end of the gate-latch.

E designates the gate-latch, having longitudinal motion between the front uprights, $a'$, of the gate, which are held apart for a sufficient distance to permit such movement of the latch therethrough. The latch is normally held in forward position by a spring, $e$, and is provided with projecting knobs $e'$, whereby it may be operated. The spring $e$ has a coiled portion, $e^2$, that is secured on one of the gate-bars by means of staples or other suitable fastening devices, and an arm, $e^3$, which is connected to the longitudinally-movable latch at or near its middle. The latch is guided and held from displacement by the front and intermediate uprights of the gate, and it bears against the lower face of one of the horizontal bars of the gate, the latch being supported by any suitable means, and held in contact with one of the bars of the gate by the arm $e^3$ of the spring.

F designates a rod loosely held in a vertical position by staples $f$ at one side of the forward upright rails, $a'$. This rod is provided at its upper end with a rearwardly-bent portion, that when the gate is at its lowest position engages a hook, $f'$, projecting from the upper rail, whereby it is held from contact with the ground. When the gate is open, the rod F is released from the hook and its lower end pressed downward into the ground, thus preventing closing of the gate, as will be understood.

That the gate may not become displaced from its hinges when being raised, I employ a nut, $g$, which is placed upon the upper end of the hinged section projecting from the post C above that part of said hinge that projects from the gate.

From the foregoing description it will be readily seen that the gate may be raised to any desired extent for the passage of sheep, hogs, &c., as well as for any other desired reason.

Modifications in detail of construction may be made in the described invention without departing from the spirit or sacrificing the advantages thereof.

In order to define the nature and scope of my invention, I would state that heretofore it has been proposed to provide a swinging gate with pivoted bars and stiles, and a series of pins or teeth on one of the horizontal gate-bars, that are adapted to be engaged by a cross bolt or pin carried by pivoted levers, the gate having a pivoted handle-lever that operates a sliding latch to enter the latch-post. I am also aware that a swinging gate has been provided with a sliding latch that is arranged and held between upright bars on the gate, and normally projected into engagement with the latch-post by a spring that is carried by the gate; also, that a swinging gate has been made vertically adjustable and guided between straps on the hinge-post, the rear stile of the gate having a series of apertures, in which are inserted pins above the free end of a lever that is pivoted on and carried by the gate, which acts upon another lever that is pivoted at one end to the hinge-post and the gate. Further, that the hanging stile of the gate has been hinged to a slotted vertically-adjustable bar, that is clamped at any desired point by means of bolts that pass through the hinge-post and carry tightening-nuts. I am further aware that a vertically-movable rod has been carried between guides on the gate and adapted to enter the ground to hold the gate open. Finally, that a swinging gate has been made vertically adjustable by means of sliding blocks, to which it is hinged, and which are provided with straps that encircle the slotted hinged post, through which are passed securing bolts or rods.

Having thus described my invention, I claim—

As an improvement in swinging gates, the combination of the following elements, to wit: a hinge-post, B, having the straps $b$, a perforated adjustable upright, C, having the guiding-strap $c$ at its lower end loosely encircling the reduced portion of the post, a pin, $c'$, confined to the post B by a cord or chain, a gate, A, the hinges $c^2 c^3$, the latch-post D, having the battens and the serrated face, a sliding latch, E, arranged between and supported by the uprights of the gate, and a spring, E, having the coil $e^2$ secured to the gate, and an arm, $e^3$, connected to the latch, the whole combined and arranged substantially as described.

In testimony that I claim the foregoing as my own I have hereto affixed my signature in presence of two witnesses.

GEORGE SHINE.

Witnesses:
HENRY HAMMOND,
JOHN S. CROSS.